Figure 1:
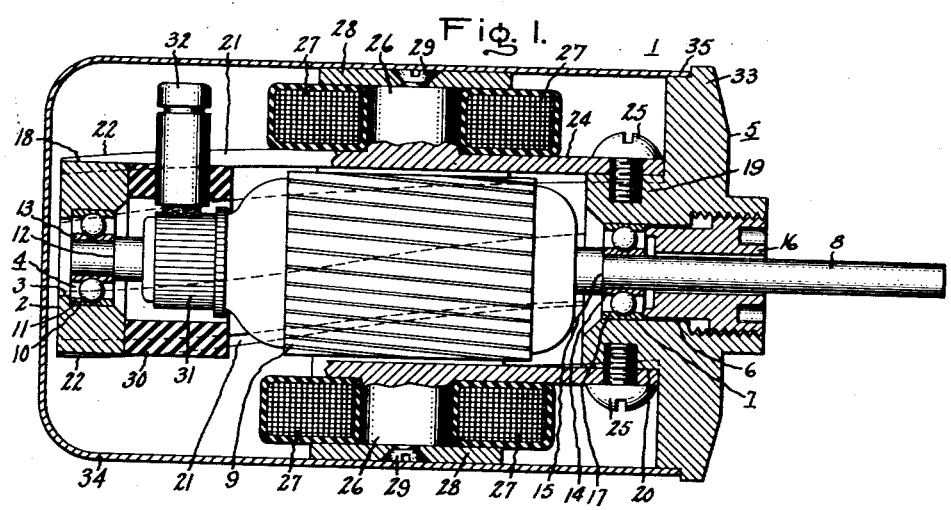

July 13, 1954  J. H. STAAK  2,683,830

DYNAMOELECTRIC MACHINE STATOR CONSTRUCTION

Filed March 23, 1953

Inventor:
Julius H. Staak,
by
His Attorney.

Patented July 13, 1954

2,683,830

UNITED STATES PATENT OFFICE 2,683,830

DYNAMOELECTRIC MACHINE STATOR CONSTRUCTION

Julius H. Staak, Fort Wayne, Ind., assignor to General Electric Company, a corporation of New York Application March 23, 1953, Serial No. 343,883

5 Claims. (Cl. 310—258)

This invention relates to the stator construction of dynamoelectric machines and more particularly to the mechanical assembly of small motors.

In the design of certain small dynamoelectric machines such as computer motors, it has been found difficult to control the length of the air gap between the rotor and field structure and the concentricity of the rotor within stator bore without the necessity for performing expensive and time consuming machining operations. It is therefore desirable to provide a construction for a small dynamoelectric machine wherein the air gap length and concentricity can be held to very close tolerances without the accompanying requirement for excessive machining and hand matching of components.

It is therefore an object of this invention to provide an improved dynamoelectric machine construction incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a pair of spaced apart end flanges are provided respectively having bearings mounted therein. A shaft is rotatably seated in the bearings with a rotor mounted thereon. Each of the two end flanges has its outer periphery machined to the desired diameter of the stator bore and a plurality of elongated pole piece members are provided each having its ends respectively secured to the outer surfaces of the end flange members thereby bridging the end flanges and defining a bore for the rotor member. Poles are respectively formed on the outer surfaces of the pole piece members and field coils are respectively arranged thereon. A yoke member surrounds the poles to complete the magnetic circuit. One of the end flange members may have an annular portion having a larger diameter to which an enclosing case is secured. A brush holder mechanism may be arranged within the pole piece members with brush holder tubes projecting therebetween.

Figure 2:
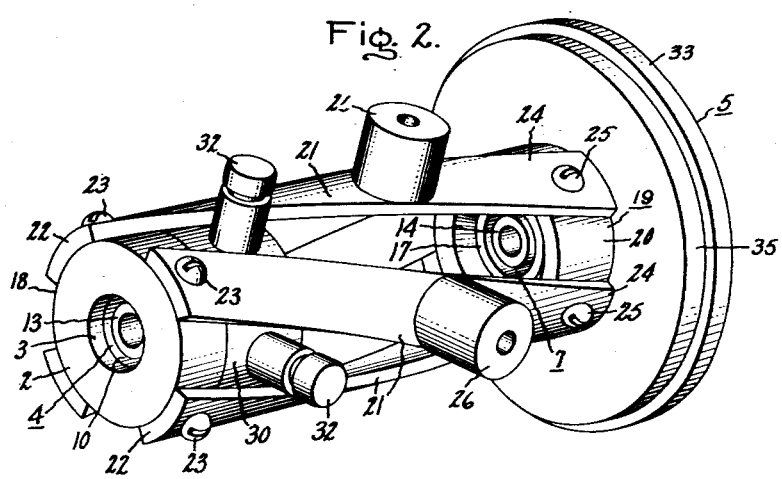

In the drawing,

Fig. 1 is a side elevational view, partly in section, illustrating the improved dynamoelectric machine construction of this invention; and Fig. 2 is a fragmentary view in perspective further illustrating the improved construction of this invention.

Referring now to Fig. 1, there is shown a dynamoelectric machine generally identified as 1, such as a small direct current computer motor for aircraft use. A first end flange member 2 is provided having a bore 3 in which a suitable anti-friction bearing 4 is arranged. A second end flange member 5 is also provided having a bore 6 in which a second anti-friction bearing 7 is arranged. A shaft 8 is rotatably seated in bearings 4 and 7 and has armature member 9 mounted thereon. It will be seen that the outer race 10 of bearing 4 is seated against a shoulder 11 formed in bore 3 of end shield 2 and that shaft 8 has a shoulder 12 seated against inner race 13 of bearing 4. Inner race 14 of bearing 7 is likewise seated against shoulder 15 of shaft 8 and axial end play of the shaft is then controlled by plug 16 threadingly seated in bore 6 of end shield 5 and bearing against outer race 17 of bearing 7.

In order to provide for mounting the field poles of machine 1, the outer periphery 18 of end flange 2 is machined concentric with bore 3 to the desired diameter of the stator bore, i. e., equivalent to the diameter of armature 9 plus twice the desired air gap length. End flange 5 is provided with an inner portion 19 having its outer periphery 20 similarly machined concentric with bore 6 to the same diameter as the outer periphery 18 of end flange 2. Four elongated pole piece members 21 are provided each having its one end 22 secured to the outer surface 18 of end flange 2 in any suitable manner, as by screws 23, and having its other end 24 secured to the outer surface 20 of inner portion 19 of end flange 5 in any suitable manner, as by screws 25. Since the outer peripheries 18 and 20 of end flange 2 and inner portion 19 of end flange 5, respectively, have been machined to the desired stator bore diameter, it will now be apparent that pole piece members 21 by bridging end flange 2 and inner portion 19 of end flange 5 define the bore for armature 9 and automatically establish the proper air gap and concentricity. Pole piece members 21 are preferably skewed or longitudinally spiralled as best shown in Fig. 2.

Suitable poles 26 are formed on pole pieces 21 and field coils 27 are arranged thereon. After assembly of the devices thus far described, outer yoke member 28 is arranged around poles 26 and may be secured thereto in any suitable manner, as by screws 29, or in the alternative may be slipped snugly or shrunk over the poles 26 to complete the magnetic circuit.

In order to provide a brush holder assembly, a split ring 30 of suitable insulating material is arranged within pole piece members 21 surrounding commutator 31 with suitable brush holder tubes 32 being mounted therein and projecting between pole piece members 21. Brush holder ring 30 is expanded into tight engagement with pole piece members 21 by any suitable expanding means, such as a split tube. This type of brush holder is more fully shown and described in my copending application Serial No. 269,278, filed January 31, 1952, and assigned to the assignee of this application.

In order to provide an enclosing case or housing, end shield 5 is provided with an annular portion 33 having a larger diameter than the diameter of the inner portion 19. A drawn outer case member 34 is arranged over yoke member 28 and engaging outer portion 33 of end flange member 5 in any suitable manner, as by the rabbet connection shown at 35.

It will now be readily seen that this invention provides a simple construction for small dynamoelectric machines wherein the air gap length and concentricity are assured with a minimum of machining.

While I have shown and described a particular embodiment of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. In a dynamoelectric machine, a stator assembly comprising a pair of spaced apart end flanges respectively having bearings mounted therein, a plurality of elongated equally spaced apart longitudinally disposed pole piece members, each of said pole piece members having its ends respectively secured to said end flanges thereby bridging the same and defining a bore for the rotor member of said machine, each of said pole piece members having a pole formed on its outer surface, field coils respectively arranged on said poles, and a yoke member surrounding said poles.

2. In a dynamoelectric machine, a stator assembly comprising a pair of spaced apart end flanges each having a cylindrical outer surface, each of said end flanges having a bearing mounted therein, a plurality of equally spaced apart longitudinally disposed pole piece members, each of said pole piece members being curved transversely to conform to said outer surfaces of said end flanges and having its ends respectively secured thereto thereby bridging the same and defining a bore for the rotor member of said machine, each of said pole piece members having a pole formed on its outer surface, field coils respectively arranged on said poles, and a yoke member surrounding said poles.

3. In a dynamoelectric machine, a stator assembly comprising a pair of spaced apart end flanges each having a cylindrical outer surface, each of said end flanges having a bearing mounted therein, a plurality of equally spaced apart longitudinally disposed pole piece members, each of said pole piece members being curved transversely to conform to said outer surfaces of said end flanges and having its ends respectively secured thereto thereby bridging the same and defining a bore for the rotor member of said machine, said pole piece members having a longitudinal spiral, each of said pole piece members having a pole formed on its outer surface, field coils respectively arranged on said poles, and a yoke member surrounding said poles.

4. In a dynamoelectric machine, a stator assembly comprising a pair of spaced apart end flanges respectively having bearings mounted therein, a plurality of equally spaced apart longitudinally disposed pole piece members, each of said pole piece members having its ends respectively secured to said end flanges thereby bridging the same and defining a bore for the rotor member of said machine, each of said pole piece members having a pole formed on its outer surface, field coils respectively arranged on said poles, yoke members surrounding said poles, and a brush holder assembly mounted within said pole piece members with brush holder tubes projecting therebetween.

5. In a dynamoelectric machine, a stator assembly comprising a first end flange having a cylindrical outer surface, a second end flange spaced from said first end flange having a first portion with a cylindrical outer surface of the same diameter as said first end flange and a second portion with a cylindrical outer surface of larger diameter than said first portion, each of said end flanges having a bearing mounted therein, a plurality of equally spaced apart longitudinally disposed pole piece members, each of said pole piece members being curved transversely to conform to said outer surfaces of said first end flange and said first portion of said second end flange and having its ends respectively secured thereto thereby bridging the same and defining a bore for the rotor member of said machine, each of said pole piece members having a pole formed on its outer surface, field coils respectively arranged on said poles, a yoke member surrounding said poles, and an outer enclosing shell member embracing said yoke member and engaging said second portion of said second end flange.

References Cited in the file of this patent

UNITED STATES PATENTS

| Number | Name | Date |
| --- | --- | --- |
| 581,089 | Southworth | Apr. 20, 1897 |
| 1,748,242 | Papst | Feb. 25, 1930 |
| 2,325,915 | Naul | Aug. 3, 1943 |
| 2,391,005 | Bryan | Dec. 18, 1945 |